Nov. 22, 1955  I. P. LICATA  2,724,569
ADAPTABLE MOUNTINGS FOR FISHING POLES
Filed May 11, 1953
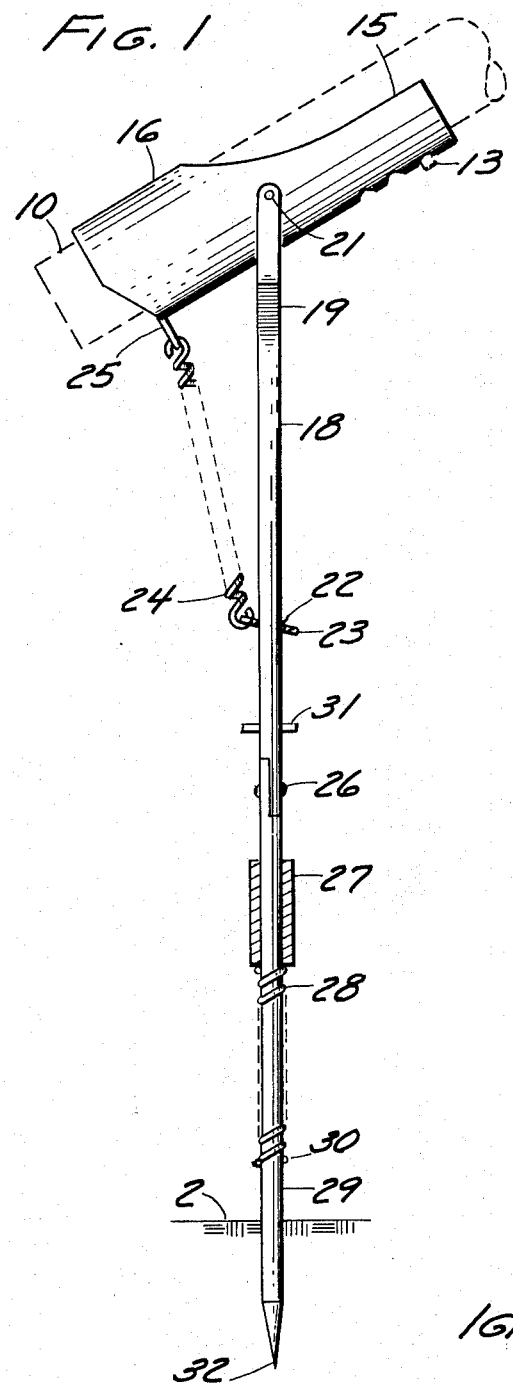
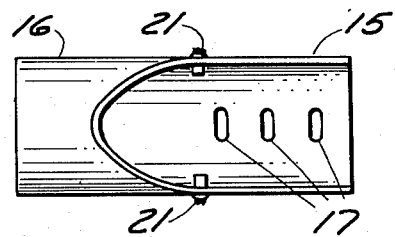
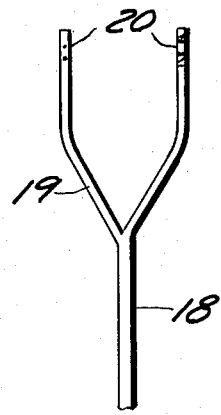
IGNATIUS P. LICATA
Inventor
By  Atty.

2,724,569

ADAPTABLE MOUNTINGS FOR FISHING POLES

Ignatius P. Licata, Toledo, Ohio

Application May 11, 1953, Serial No. 354,011

1 Claim. (Cl. 248—42)

This invention relates to pole or rod handle engaging means for effectively holding the pole as well as being adjustable to respond to different ranges of forces and angular deflections.

This invention has utility when incorporated in fishing pole engaging sockets, especially wherein there is a hole or aperture for receiving a finger guard which aids in retaining the fishing pole handle seated in the socket. The staff for carrying the socket has a full range of anchoring means for either shore or other location to meet the requirements of the fisherman. Furthermore, the provision of an adjustable spring determines the inclination for the fishing pole when in its rest position and enables the pole angle to yield and flex when a fish may exert a pull on the line.

Referring to the drawings:

Fig. 1 is a side elevation of the unit for mounting in the earth at the shore or bank adjacent to the region for fishing;

Fig. 2 is a plan view of the rockable socket for the unit; and

Fig. 3 is a fragmentary view looking from the left of Fig. 1 of the top fork portion of the staff or supporting stem for the socket.

In proximity to stream or lake region of water, there may be a bank 2. The fisherman may be equipped with a fishing pole having a handle 10. Conveniently adjacent the handle portion 10 of the rod or pole is a finger guard 13.

The special unit comprises a receiver or socket section having an open top front channel or trough portion 15 with an aft ring or tubular portion 16. Along the bottom of the channel 15 are situated apertures or holes 17 into which a finger guard 13 may be thrust, thereby to have the ring 16 at all times fully embrace the handle portion 10 extending thereinto.

A stem 18 is of tubular or circular cross section and terminally spilt to provide a fork 19 having adjacent its free ends openings 20 for an aligned pair of pivots 21 in the relatively rockable assembly with the stem or staff 18 of the socket 15, 16. The stem 18 extends thru a circular opening 22 in a plate 23. The lower end of a tension helical spring 24 extends upward from the plate 23 to a downwardly bent ear 25 from the under side of the ring 16 of the socket. The tension of the spring 24 tends to rock the plate 23 on the stem 18 into clamp or holding relation for the plate 23 as to the stem 18. From this it follows that as the plate 23 is slid upwardly along the stem 18 toward the socket 15, 16, the channel 15 dips more downwardly. Upon sliding the plate 23 downward along the stem 18, the socket channel 15 is directed at an upward angle of balance, with the fishing pole assembled thereon. A pull on the line from the fishing pole downwardly is yieldably resisted by the spring 24 which spring enables the line 6 to be held taut at all times whether the line is being pulled or slacked back. The fork 19 with its pivotal connection 21 centrally of the socket 15, 16, allows this rocking of the pole in a vertical plane as the stem 18 is held from turning.

It is intended that this unit be of a dimension permitting convenient stowing away, as in a kit box for taking to and fro the fishing excursion. A desirable length for the staff 18 is made possible by providing an overlap joint 26 (Fig. 1), over which may be thrust a sleeve 27 by a compression helical spring 28 about shaft extension section 29. Fig. 1 shows the sleeve 27 in compressed position to permit folding. A pin 30 thru the shaft or stem 29 is an abutment to direct the spring 28 in its thrust to shift the sleeve 27 about the stem 29 to ride over the joint 26 and thus to hold the section 29 aligned with the stem section 18. In this locking, the sleeve 27 has its top limit of travel against a pin 31 thru the section 18 above the joint 26. The stem terminates in a pointed lower end 32, convenient for pushing the stem into the soil or bank 2 for locating the holder upright and sufficiently rigid to withstand a game fish pulling thereon.

The positioning of the pole handle 10 in the socket may be well taken care of due to the finger guard 13 entering a hole 17. However, there may be additional holding due to the projection of the pair of pivot pins 21 diametrically of the channel portion 15 of the socket. While the inner tips of the pivots 21 may be of yielding material, such as rubber, another factor in the yield for promoting this snap assembly of the pole with the socket is in the engagement of the finger guard 13 into one of the holes 17 while the handle 10 extends thru the sleeve ring portion 16 of the socket.

If it is desired to prevent the staff 18, 29, from rotating or turning when it is stuck into the earth, it may be rammed sufficiently deep into the earth so that the pin 30 contacts the earth and acts as a snag, at or just upon entering the soil, to prevent the turning. For greater non-turning effectiveness, the pin 30 may be of greater length, or of such a design to protrude longer on one side than the other of the staff, in which event, the longer protruding portion of the pin 30 may serve as the more effective non-turn feature of the unit.

What is claimed and it is desired to secure by Letters Patent is:

A support for mounting a fishing pole having an outwardly projecting finger guard at its handle; comprising a pole grip receiver of cylindrical form at one end merging into an open top channel at the other end, a series of aligned apertures in the bottom of the channel portion of said receiver for receiving said projecting finger guard to adjustably balance the pole in said receiver, an upright staff pivotally connected centrally to the receiver, a tiltable ring clutch disposed on said shaft, and a tension helical spring connecting the cylindrical end of the receiver to the ring, said ring being shiftable along the shaft toward and away from the receiver for adjusting the tension of the spring to coact in yieldably balancing the pole.

UNITED STATES PATENTS

References Cited in the file of this patent

| | | |
|---|---|---|
| 1,256,191 | Wittkowski | Feb. 12, 1918 |
| 1,703,554 | Slauter et al. | Feb. 26, 1929 |
| 2,204,692 | Parisio | June 18, 1940 |
| 2,311,823 | Gaskill, Sr. | Feb. 23, 1943 |
| 2,518,908 | Korus | Aug. 15, 1950 |
| 2,548,328 | Thayer | Apr. 10, 1951 |
| 2,560,150 | Bateman | July 10, 1951 |
| 2,598,021 | Schwanke | May 27, 1952 |